US012660834B2

(12) United States Patent
Stoffers et al.

(10) Patent No.: US 12,660,834 B2
(45) Date of Patent: Jun. 23, 2026

(54) METHOD FOR SMEAR-RIPENING OF CHEESE

(71) Applicant: EIDGENÖSSISCHES DEPARTEMENT FÜR WIRTSCHAFT, BILDUNG UND FORSCHUNG (WBF) AGROSCOPE, Bern (CH)

(72) Inventors: Helena Stoffers, Konolfingen (CH); Hans-Peter Bachmann, Merligen (CH); Karl Schafroth, Langnau (CH)

(73) Assignee: EIDGENÖSSISCHES DEPARTEMENT FÜR WIRTSCHAFT, BILDUNG UND FORSCHUNG (WBF) AGROSCOPE, Bern (CH)

( * ) Notice: Subject to any disclaimer, the term of this patent is extended or adjusted under 35 U.S.C. 154(b) by 267 days.

(21) Appl. No.: 18/031,501

(22) PCT Filed: Oct. 11, 2021

(86) PCT No.: PCT/EP2021/078069
§ 371 (c)(1),
(2) Date: Apr. 12, 2023

(87) PCT Pub. No.: WO2022/078967
PCT Pub. Date: Apr. 21, 2022

(65) Prior Publication Data
US 2023/0380437 A1 Nov. 30, 2023

(30) Foreign Application Priority Data
Oct. 12, 2020 (EP) .................................... 20201350

(51) Int. Cl.
*A23C 19/16* (2006.01)
*A23C 19/068* (2006.01)

(52) U.S. Cl.
CPC ........ *A23C 19/166* (2013.01); *A23C 19/0682* (2013.01)

(58) Field of Classification Search
CPC .......................... A23C 19/0682; A23C 19/166
(Continued)

(56) References Cited

U.S. PATENT DOCUMENTS 2,641,545 A 6/1953 Kraft

FOREIGN PATENT DOCUMENTS

FR 1 437 562 A 5/1966
FR 2 710 820 A1 4/1995
(Continued)

OTHER PUBLICATIONS

Leclerc et al WO1998034493A1 Google patent translation (Year: 1998).*
(Continued)

*Primary Examiner* — Subbalakshmi Prakash
(74) *Attorney, Agent, or Firm* — Sughrue Mion, PLLC

(57) ABSTRACT

A method for smear-ripening a cheese is disclosed. The method includes a step of applying an envelope on a freshly brined cheese which is in direct physical contact with the surface of the cheese and which is permeable for metabolites produced by microorganisms and for microorganisms themselves and for components of the cheese and for gaseous elements, in particular surrounding air, followed by ripening the cheese within the envelope. A cheese obtained by the method is less susceptible to develop an off-odour after storage in a packaging material, in particular an air-tight packaging material, than a comparable cheese that was not produced according to the above method. Furthermore, such cheese typically contains a residual smear layer of not more than 10% of a comparable cheese.

15 Claims, 4 Drawing Sheets

(58) Field of Classification Search
USPC ......................................................... 426/582
See application file for complete search history.

(56) References Cited

FOREIGN PATENT DOCUMENTS

| | | |
|---|---|---|
| FR | 2 759 253 A1 | 8/1998 |
| FR | 2 774 556 A1 | 8/1999 |

OTHER PUBLICATIONS

S. Hostin, et al., "Properties of smear from the surface of Roquefort-type cheeses.(translated) TIOL-Eigenschaften der Schmiere der Kaeseoberflaeche der Roquefortart.", International Food Information Service (IFIS), pp. 106-109.
International Search Report for PCT/EP2021/078069, filed Jan. 11, 2022 [PCT/ISA/210].
Written Opinion for PCT/EP2021/078069, filed Jan. 11, 2022 [PCT/ISA/237].
European Patent Office, Communication issued May 30, 2025 in copending European Application No. 21 783 032.2.

* cited by examiner

METHOD FOR SMEAR-RIPENING OF CHEESE

CROSS REFERENCE TO RELATED APPLICATIONS

This application is a National Stage of International Application No. PCT/EP2021/078069 filed Oct. 11, 2021, claiming priority based on European Patent Application No. 20201350.4 filed Oct. 12, 2020.

TECHNICAL FIELD

The present invention relates to a method for producing a smear-ripenened cheese and to a cheese obtainable or obtained by such method. In particular, the present invention relates to a method by which it is possible to remove part of the smear surface prior to packaging.

BACKGROUND ART

Smear-ripened cheeses are characterized by a complex microflora, which develops on the surface during ripening. The development of the microflora contributes to a red-orange pigmented surface.

Methods for smear-ripening a cheese are known in the art. According to a conventional process for providing a smear-ripened cheese, a freshly brined cheese block is frequently brushed (smeared) with a smear liquid. Such a process is either labour-intensive in case of manual brushing or capital-intensive in case brushing is performed by robots. Moreover, frequent brushing usually leads to an at least partial destruction of the primary structure of the cheese which results from the press mould.

Usually the cheese is brushed 3-5 times per week until growth of the microorganisms within the smear layer has started. Then, the frequency of brushing can be reduced stepwise to 1-2 times per week until the ripening process is complete.

Suitable smear liquids are known in the art. Usually, a smear liquid comprises salty water or a whey liquid solution and may or may not comprise commercially available microorganisms, so called surface starters.

Usually, the salty water comprises 2-5% sodium chloride. Examples of surface starter organisms are *Debaryomyces hansenii, Geotrichum candidum, Brevibacterium linens, Brevibacterium casei, Staphylococcus equorum, Microbacterium gubbeenense, Arthrobacter* spp., *Corynebacterium casei* and mixtures thereof.

Ripening occurs in a climate-controlled environment at a temperature of 8° C. to 20° C. and a high relative humidity. Usually the relative humidity is at least 90% RH.

Irrespective of whether or not such microorganisms are comprised in the smear liquid, the resulting smear in general comprises a mixture of microorganisms. Such microorganisms in general are (1) yeasts, (2) Gram-positive bacteria, (3) Gram-negative bacteria, (4) moulds and mixtures thereof.

Usually, in smear liquids one or more of the following microorganisms are found:

yeasts such as *Debaryomyces hansenii, Kluyveromyces marxianus, Kluyveromyces lactis, Geotrichum candidum* and mixtures thereof;

Gram-positive bacteria such as coryneform bacteria, *Micrococcaceae* and mixtures thereof, wherein examples of coryneform bacteria are *Brevibacterium linens, Brevibacterium aurantiacum* and *Arthrobacter* sp. and mixtures thereof; and examples of Micrococcaceae are *Micrococcus* sp., non-pathogenic *Staphylococcus* sp. and mixtures thereof, Gram-negative bacteria such as Enterobacteriaceae, Halomonadaceae, Alcaligenaceae, Caulobacteriaceae, Mbraxellaceae, Oceanospirillaceae, Pseudoaltero-monadaceae, Pseudomonadaceae, Vibrionaceae, Xanthomonadaceae, in particular Enterobacteriaceae, and mixtures thereof; and Moulds such as *Bisifusarium domesticum*.

Selected moulds such as *Bisifusarium domesticum* can have a positive effect on the smear by reducing stickiness. Many moulds, however, lead to undesirable discolouration or can even form mycotoxins.

The composition of the smear typically changes during ripening.

In some cases it is desired to pack the cheese in a packaging material for post-ripening storage, distribution and/or sales. Such packaging material is typically airtight. During storage in such a packaging material, the metabolism and/or composition of the microflora of a smear-ripened cheese in general changes. During storage in a packaging material, in particular air-tight packaging material, the smear surface may also become sticky and an off-odour may develop. Such a sticky surface and/or off-odourous surface is also referred to as a defective or faulty smear. The off-odour that may escape the packaging material upon opening is also referred to as off-flavouring.

The group of substances that contribute to the off-flavour comprises ammonia and low molecular weight sulphur compounds such as methanethiol ($CH_3SH$), hydrogen sulphide ($H_2S$), dimethyl sulphide (DMS), dimethyl disulphide (DMDS), dimethyl trisulphide (DMTS) and carbonyl sulphide (herein collectively referred to as "off-flavour compounds"). Moreover, sulphur compounds may interact with each other and with other compounds in the cheese, generating other volatile off-flavour compounds.

Hostin et al. [Hostin S and Palo V, 1992, Milchwirtsch. Ber. Bundesanst. Wolfpassing Rotholz No. 111: 106-109, Eigenschaften der Schmiere der Käseoberflache der Roquefortart, International food information service, database accession no. FS-1993-01-P-0075] describes the properties of smear from the surface of Roquefort-type cheeses. However, this document does not provide any guidance for a manufacturing method for a smear-ripened cheese, or a cheese obtainable by such method, with improved properties for storage in a packaging material.

U.S. Pat. No. 2,641,545 describes production of a soft surface cured cheese using a porous fabric. The fabric is removed by the consumer and facilitates removal of a mould pad that is formed during ripening. However, this document does not provide any guidance for a manufacturing method for a smear-ripened cheese, or a cheese obtainable by such method, with improved properties for storage in a packaging material.

FR 2774556 describes production of a cheese comprising a peelable rind and a ribbon that facilitates removal of the rind by the consumer. However, this document does not provide any guidance for a manufacturing method for a smear-ripened cheese, or a cheese obtainable by such method, with improved properties for storage in a packaging material.

FR 2710820 describes a production method for a cheese comprising jellification of the cheese and introduction of the cheese, before or after jellification, into an intestine casing which is semi-permeable for gas and humidity. However such intestine casing is inherently impermeable for microorganisms. Moreover, the casing is to be removed by the consumer. Thus, this document does not provide any guidance for a manufacturing method for a smear-ripened cheese, or a cheese obtainable by such method, with improved properties for storage in a packaging material.

FR 1437562 also describes a method of manufacturing a cheese using a casing that is removed by the consumer in order to facilitate removal of the rind of a cheese. Thus, this document does not provide any guidance for a manufacturing method for a smear-ripened cheese, or a cheese obtainable by such method, with improved properties for storage in a packaging material.

DISCLOSURE OF THE INVENTION

Hence, it is a general object of the invention to provide an improved method for providing a smear-ripened cheese with reduced off-flavouring and/or reduced stickiness of the surface upon storage in a packaging material, in particular an air-tight packaging material, and/or a facilitated smear-ripening method.

Unless otherwise stated, the following definitions shall apply in this specification:

As used herein, the term "a", "an", "the" and similar terms used in the context of the present invention (especially in the context of the claims) are to be construed to cover both the singular and plural unless otherwise indicated herein or clearly contradicted by the context.

As used herein, the terms "including", "containing" and "comprising" are used herein in their open, non-limiting sense. It is understood that the various embodiments, preferences and ranges may be combined at will.

The term "fabric" is known in the field and particularly relates to textile materials made from fibers. The term "fabric" also encompasses the terms "textile fabric", "textile sheet material", "fibre aggregate", "textile surface", "textile structure", "textile surface structure".

The term "woven fabric" is known in the field and relates to a fabric formed by weaving. Woven fabrics are often created on a loom, and made of many threads woven on a warp and a weft. A woven fabric is made by interlacing two or more threads at right angles to one another.

The term "knitted fabric" is known in the field and relates to a fabric made (i.e. knitted) of thread systems by forming stitches on a knitting machine. Knitted fabrics are commonly used, for example, to make underwear or curtain fabrics.

The term "non-woven fabric" is known in the field and relates to sheet or web structures bonded together by entangling fiber or filaments (and by perforating films) mechanically, thermally or chemically. The term is used to denote fabrics which are neither knitted nor woven.

As used herein, the term "biodegradable" or "biodegradability" relates to the "cradle to cradle" (C2C) standard. C2C Certified compostability requirements are specified for example in EN 13432 (alternatively ISO 17088, ISO 18606 or ASTM D6400). However, to meet C2C Certified compostability requirements, the fabric must be appropriate for home composting, and must not be limited to industrial composting facilities.

As used herein, the term "comparable cheese" relates to a smear-ripened cheese of the same cheese group, according to the German cheese regulation as of date 2 Jun. 2021, as the cheese produced by the inventive method.

Now, in order to implement these and still further objects of the invention, which will become more readily apparent as the description proceeds, a manufacturing method for smear-ripened cheese is disclosed. The inventive method for producing a smear-ripened cheese is manifested by the steps a) applying an envelope on a pressed and freshly brined cheese, said envelope being in direct physical contact with the surface of the cheese, said envelope being permeable for metabolites produced by microorganisms and for microorganisms themselves and for components of the cheese and for gaseous elements, in particular surrounding air;

b) ripening the cheese within the envelope;

c) removing the envelope with thereon adherent part of a smear (or smear pad) formed during ripening.

In a preferred embodiment, after step c), the thus obtained cheese is packaged for transport and/or sale in a subsequent step d).

Such a procedure leads to a smear-ripened cheese with a residual smear layer of less than 50%, preferably less than 30%, more preferably less than 10%, of the smear layer of a comparable cheese which was produced by a method for smear-ripening which is currently known in the art.

Further, the inventive method leads to a smear-ripened cheese with an improved preservation of the primary structure of the cheese resulting from the press mould and with improved properties upon storage in a packaging material.

A further advantage of the method is that regular brushing with a smear liquid is not required. Instead, immersing the cheese in a smear liquid, optionally comprising surface starter organisms, preferably directly after step (a), and afterwards keeping the cheese humid is sufficient. This shall be explained in more detail below.

A first aspect of the invention is that the microorganisms are cultured on a removable envelope, which is permeable for metabolites produced by microorganisms and for the microorganisms themselves and for components of the cheese and for gaseous elements, in particular surrounding air. The envelope is applied onto the cheese immediately after brining.

The envelope is in direct physical contact with the cheese, preferably over its entire surface.

In an advantageous embodiment, the envelope contains pores and/or micropores, preferably pores having a mean pore size in the range of 0.01 mm-2.00 mm, preferably in the range of 0.1 mm-1.0 mm, such as 0.3 mm-0.7 mm.

The mean pore size may be measured by clamping the envelope in a tentering frame and applying to the envelope maximum extension in the elastic range of the envelope (no overstretching of the envelope). The mean pore size can be measured using a microscope, preferably a digital microscope, e.g. an Olympus DSX110 microscope. Typically, the mean pore size is determined from the pores that are visible on a 5.8×5.8 mm sized microscopy image with 48 fold magnification (see e.g. FIGS. 2-4), or from a suitable multitude of pores, such as 10 pores that are visible on said microscopy image.

In general, pores can have different shapes. A broad range of pore shapes of the envelope is suitable for the inventive method, e.g. a circular shape or an oval shape, such as an ellipse, or a polygonal shape, such as a quadrangle, pentagon, hexagon, heptagon, octagon, nonagon, or decagon. In case of a circular shape, the pore size relates to the diameter of the pore. In case of a polygonal shape, the pore size can be determined either by measuring the width or the height of the pore, i.e. the distance between the most distant corners (sometimes also referred to as vertices) of a polygonal pore in horizontal ("from left to right") or vertical ("from top to bottom") direction, respectively. Alternatively, pore size can be determined by measuring the distance between the most distant points (e.g. of an oval shape) or corners (e.g. of a polygonal shape) of the pore. In each case, the pore size is measured in the extended state of the envelope as described above. However, the exact method of measuring the mean pore size is not critical as long as the mean pore size is measured in the extended state of the envelope as described above.

In another advantageous embodiment, the envelope is elastic. Suitable elasticity values are in the range of 10-500%, i.e. the envelope can be elastically extended by 10-500% of its size in a non-extended state, measured according to DIN EN 14704-1. More preferably, the envelope is 50-350% elastic, most preferably 100-300% elastic, again measured according to DIN EN 14704-1.

Suitable fabrics complying with the elasticity and porosity as defined above are known in the field and commercial items. In an advantageous embodiment, the envelope comprises, particularly consists of, knitted fabrics or woven fabrics or non-woven fabrics, in particular knitted fabrics or woven fabrics, most preferably knitted fabrics.

In another advantageous embodiment, the envelope comprises materials selected from the group consisting of natural or synthetic polymeric materials and mixtures thereof.

Natural polymeric materials may be selected from the group consisting of cellulose, cotton, wool, silk, cashmere and mixtures thereof.

Synthetic materials may be selected from the group consisting of cellulose-derivatives such as cellulose acetate and nitrocellulose, polyamides such as nylon, elastomers, polyurethanes, polyolefins such as polypropylenes, polyesters such as polyethylene terephthalate (PET), polyethylene glycols (PEG), acrylics and mixtures thereof. Elastane (synonymously spandex or lycra) is a mixture of polyurethane and polyethylene glycol.

In addition, suitable synthetic materials may also be made from and/or comprise natural polymeric materials, in particular cellulose, and/or cellulose-derivatives such as cellulose acetate and nitrocellulose. Such synthetic materials are sometimes also referred to as semi-synthetic materials. Suitable examples of such synthetic (or semi-synthetic) materials are rayon, lyocell, modal and micromodal.

Cellulose derivatives include materials comprising a characteristic backbone of cellulose wherein one or more of the hydroxyl groups are substituted, e.g. by nitro- or acetate groups.

In an advantageous embodiment, the envelope comprises cellulose and/or cellulose derivatives such as cellulose acetate and nitrocellulose. Preferably, the envelope comprises cellulose or cellulose derivatives that have been obtained from hard wood, in particular obtained from beech tree.

Modal is a form of rayon and consists of cellulose and/or cellulose derivatives as defined above. Micromodal is a finer variant of modal. Micromodal fibres have a diameter of less than 10 μm (microfiber). The term "micromodal" as used herein is thus synonymous to "modal fibres having a diameter of 0.1-10 μm".

In an advantageous embodiment, the envelope comprises modal or micromodal.

Lyocell is a form of rayon and consists of cellulose and/or cellulose derivatives as defined above. In another advantageous embodiment, the envelope comprises lyocell.

In another advantageous embodiment, the envelope comprises elastane (synonymously spandex, Lycra).

In another advantageous embodiment, the envelope consists of a mixed fabric comprising cellulose or cellulose derivatives and elastane.

In a particularly advantageous embodiment, the envelope consists of a mixed fabric comprising, preferably consisting of, (i) modal or micromodal and (ii) elastane.

In an advantageous embodiment, the envelope consists of a mixed fabric comprising, preferably consisting of, (i) 80-95% modal or micromodal, and (ii) 5-20% elastane. A particularly suitable envelope consists of (i) 92% modal or micromodal and (ii) 8% elastane.

An example of such an envelope is an envelope consisting of the fabric "26319/1, 28 E Single Jersey Micromodal-Elastane".

In another advantageous embodiment, the envelope comprises 0-100% polyamide, 0-60% elastane, 0-70% polyurethane, 0-40% polypropylene and 0-70% cotton.

Preferably, the envelope comprises, more preferably consists of, materials that are biodegradable. Examples of biodegradable materials are modal, micromodal and lyocell.

In a further embodiment, the envelope comprises materials selected from the group consisting of natural or synthetic polymeric materials and mixtures thereof, in particular materials selected from the group comprising polyamides such as nylon, elastomers, polyurethanes, polypropylenes, polyesters, acrylics, polyolefins, rayon, cotton, wool, silk, cashmere and mixtures thereof.

In another advantageous embodiment, the envelope has a thickness of between 0.001 mm-1.0 mm, preferably 0.01 mm-0.1 mm. The envelope may thus also be a sheet-like material or a thin film.

In another advantageous embodiment, the envelope comprises knitted or woven-fabrics, preferably knitted fabrics, consisting of yarns having a linear mass density (i.e. the thickness of a yarn in only one dimension; also referred to as linear density) of 5-165 DTEX, preferably 10-120 DTEX, more preferably 15-100 DTEX. The linear mass density of a yarn can be measured according to DIN EN ISO 2060.

An alternative unit for expressing the linear mass density of a yarn is "metric count (Nm)". The unit "Nm" is defined as the number of meters per gram of fiber or yarn. For example, 50.8 Nm correspond to 50.8 m per gram of yarn.

Thus in an advantageous embodiment, the envelope comprises knitted or woven-fabrics, preferably knitted fabrics, consisting of yarns having a linear mass density of 2.000-61 Nm, preferably 667-83 Nm, more preferably 667-400 Nm.

In another advantageous embodiment, the envelope prevents or at least reduces spread of mycelium on the cheese surface. Preferably, the envelope serves as a physical barrier against the spread of mould mycelium.

In another advantageous embodiment, before step a) the envelope is elastically extended and applied in step a) in such an at least partially elastically extended state.

In another advantageous embodiment, in step (b) ripening is achieved by (b1) immersing the enveloped cheese in a smear liquid, optionally comprising surface starter organisms; and afterwards (b2) keeping the cheese humid by spraying onto said cheese water, optionally water comprising 2-5% sodium chloride.

Preferably, in step (b2), water, optionally comprising 2-5% sodium chloride, is sprayed onto the enveloped cheese 3-5 times per week until growth of the microorganisms within the smear layer has started. Then, the frequency of spraying can be reduced stepwise to 1-2 times per week until the ripening process is complete.

Hence, a further advantage of the method is that brushing of the cheese surface with a smear liquid is not required. Nevertheless, brushing is possible within the scope of the method.

A second aspect of the invention relates to a cheese or piece of cheese obtainable or obtained by the method of the invention. Due to the removal of the envelope with thereon adherent part of a smear, the inventive method in particular leads to a smear-ripened cheese that is less susceptible to develop an off-odour after storage in a packaging material, in particular an air-tight packaging material, than a comparable cheese that was not produced according to the inventive method. Nevertheless, a cheese or piece of cheese obtainable or obtained by the inventive method typically maintains, or at least partially maintains, the optical characteristics of a comparable cheese that was produced according to a traditional method. Some of the advantageous characteristics of a smear-ripened cheese that was produced according to the inventive method are described in further detail in the following embodiments (also third to eighth aspect of the invention). These characteristics of the cheese are a consequence of the inventive method by which the cheese was produced.

In an advantageous embodiment, a cheese or piece of cheese obtainable or obtained by the method of the invention has a red-orange surface.

It is clear to the person skilled in the art that the various types of smear-ripened cheese differ in their exact composition and physical properties. Moreover, smear-ripened cheeses of the same type that were produced at different sites can also differ in their composition and physical properties. Nevertheless, the composition and the physical properties of a given cheese can be determined by one or more of the methods described below.

Hence, in order to determine if a smear-ripened cheese was produced according to the method of the invention, a comparable cheese (or a statistically significant number of comparable cheeses) can be produced by the method of the invention and be used as reference material. As defined above, such comparable cheese is a smear-ripened cheese of the same cheese group according to the German cheese regulation as of date 2 Jun. 2021. Comparison of a smear-ripened cheese with this reference material thus offers a possibility to determine if a smear-ripened cheese was produced by the method of the invention.

In an alternative method, a comparable cheese or a statistically significant number of comparable cheeses is produced using a currently known method for smear ripening and a similar number of cheese(s) is produced using the inventive method. The respective characteristics of a cheese of interest are determined and compared with the characteristics of the comparable cheese(s). Again, a comparable cheese is a smear-ripened cheese of the same cheese group according to the German cheese regulation as of date 2 Jun. 2021.

As an example, the specific values given in the further aspects below were obtained using a traditional semi-hard cheese variety produced in an artisanal cheese dairy.

A third aspect of the invention relates to a cheese or piece of cheese obtainable or obtained by the method of the invention which has a residual smear layer with a mean thickness of less than 50%, preferably less than 30%, more preferably less than 10%, of the smear layer of a comparable cheese which was produced by a method for smear-ripening which is currently known in the art, i.e. smear-ripening without an envelope.

In another advantageous embodiment, a cheese or piece of cheese, obtainable or obtained by the method of the invention, has a residual smear layer with a mean thickness of in general not more than 0.2 mm, preferably less than 0.1 mm.

In a preferred embodiment, a cheese or piece of cheese, obtainable or obtained by the method of the invention, has a residual smear layer with a mean thickness of between 0.05 mm to 0.2 mm, preferably 0.05 mm to 0.1 mm. The mean thickness of the smear layer can be measured by microscopy, e.g. using an Olympus DSX110 microscope.

A fourth aspect of the invention relates to a cheese or piece of cheese, obtainable or obtained by the method of the invention, which has an increased water content compared to a comparable cheese which was smear-ripened by a method currently known in the art.

It was surprisingly found that the inventive method reduces the loss of water during ripening which results in a softer cheese texture (may be measured using a texture analyser; cf. sixth aspect of the invention) and a more aromatic cheese.

In particular, the water content after 1, 2, 3 and/or 4 months of ripening is increased by at least 1%, preferably 2%, more preferably 3% compared to a smear-ripened cheese which was produced without an envelope. The water content is dependent on the type of cheese. For example, for the aforementioned traditional semi-hard cheese variety which was produced according to the method of the invention, the water content is at least 370 g/kg as measured according to Agroscope method 13.8 ME.068 (accredited according to ISO/IEC 17025:2017) as of date Feb. 25, 2019, available from Agroscope upon request.

In an advantageous embodiment, said lesser decrease in water content leads to a thinner cheese rind compared to a cheese that was smear-ripened by a method currently known in the art.

A fifth aspect of the invention relates to a cheese or piece of cheese, obtainable or obtained by the method of the invention, where the ripening process occurs faster than during a process for smear-ripening a cheese which is currently known in the art.

In case of the aforementioned traditional semi-hard cheese variety, said faster ripening is characterised by at least one of the following characteristics, determined after 4 months of ripening, in comparison to a comparable cheese, which was smear-ripened by a method which is currently known in the art:

a decrease in total lactic acid of at least 20 mmol/kg as measured according to Agroscope method 13.6 ME.026 (accredited according to ISO/IEC 17025: 2017) as of date Apr. 3, 2014, available from Agroscope upon request;

an increase in the concentration of total volatile carboxylic acids of at least 10 mmol/kg as measured according to Agroscope method 13.8.ME.030 (accredited according to ISO/IEC 17025:2017) as of date Nov. 8, 2017, available from Agroscope upon request.

In more detail:

the concentration of iso-valeric acid is increased by at least 0.2 mmol/kg as measured according to Agroscope method 13.8.ME.030 (accredited according to ISO/IEC 17025:2017) as of date Nov. 8, 2017, available from Agroscope upon request;

the concentration of iso-butyric acid is increased by at least 0.2 mmol/kg as measured according to Agroscope method 13.8.ME.030 (accredited according to ISO/IEC 17025:2017) as of date Nov. 8, 2017, available from Agroscope upon request.

Furthermore, in said cheese, which was smear ripened according to the method of the invention, the concentration of total lactic acid is less than 60 mmol/kg; and/or total volatile carboxylic acids is at least 25 mmol/kg; and/or iso-valeric acid is at least 0.23 mmol/kg; and/or iso-butyric acid is at least 0.4 mmol/kg as measured according to the corresponding method described above.

In another preferred embodiment, said faster ripening is characterised by an increase in the fraction of non-protein nitrogen relative to total nitrogen compared to a comparable cheese that was smear-ripened by a method currently known in the art for 4 months. In particular, the fraction of non-protein nitrogen relative to total nitrogen is at least 16.5%. The concentration of total nitrogen is measured according to Agroscope method 13.8.ME.061 (accredited according to ISO/IEC 17025:2017) as of date Feb. 22, 2019, available from Agroscope upon request. The concentration of non-protein nitrogen is measured according to Agroscope method 13.8.ME.054 (accredited according to ISO/IEC 17025:2017) as of date Feb. 22, 2019, available from Agroscope upon request.

The fraction of non-protein nitrogen relative to total nitrogen is calculated by dividing the concentration of non-protein nitrogen by the concentration of total nitrogen.

In another advantageous embodiment, said faster ripening is characterised by an increase of the pH value in the cheese distant from the smear such as 10 cm from the smear or at the centre of the cheese in case of whole cheeses. For the semi-hard cheese investigated, after 4 months of ripening the pH increased by at least 0.15 compared to a comparable cheese that was smear-ripened by a method currently known in the art. In particular, the pH value after 4 months of ripening is at least 5.80. The pH value is measured according to Agroscope method 13.8.ME.056 (accredited according to ISO/IEC 17025:2017) as of date Dec. 2, 2019, available from Agroscope upon request.

A sixth aspect of the invention relates to a cheese or piece of cheese obtainable or obtained by the method of the invention, which is softer (softer cheese texture) than a comparable cheese that was smear-ripened by a method currently known in the art. In particular, the force required for a 33% deformation of the aforementioned traditional semi-hard cheese variety upon uniaxial compression is 3 N lower compared to a comparable cheese that was smear-ripened by a method currently known in the art. In particular, the force required for a 33% deformation of the cheese upon uniaxial compression is lower than 17 N. Suitable methods of measuring the texture of a cheese are known in the art. For example, the cheese texture may be measured using a texture analyser. In particular, the force required for a 33% deformation as described above is measured according to Agroscope method 18.6.2.ME.026 (accredited according to ISO/IEC 17025:2017) as of date Jan. 23, 2017, available from Agroscope upon request.

A seventh aspect of the invention relates to a cheese or piece of cheese obtainable or obtained by the method of the invention, which leads to less off-flavouring during storage in an air-tight (or essentially air-tight) packaging than a comparable cheese that was not produced according to the method of the invention. An air-tight (or essentially air-tight) packaging is a packaging leading to an anaerobic environment.

The group of substances which contribute to the off-flavouring ("off-flavour compounds") comprises ammonia and low molecular weight sulphur compounds such as methanethiol, hydrogen sulphide, dimethyl sulphide (DMS), dimethyl disulphide (DMDS), dimethyl trisulphide (DMTS) and carbonyl sulphide. Moreover, sulphur compounds may interact with each other and with other compounds in the cheese, generating other volatile off-flavour compounds.

In an advantageous embodiment, a cheese or piece of cheese, obtainable or obtained by the method of the invention, shows less, in particular 10-80% (w/w) less, volatile off-flavour compounds compared to a comparable cheese that was not produced according to the inventive method, measured by gas chromatography (GC) upon storage in an air-tight packaging for at least 10 days.

In particular the off-flavour compounds are as defined above (ammonia, low molecular weight sulphur compounds).

In more detail, the formation of ammonia and other volatile off-flavour compounds from a first packaged cheese, which was smear-ripened according to the method of the invention, and a second packaged cheese, which was not smear-ripened according to the method of the invention but according to a currently known method for smear-ripening and which has the same remaining time to the expiry date, can be determined according to the following methods:

The amount of ammonia can be measured according to Agroscope method 13.6.ME.089 (accredited according to ISO/IEC 17025:2017) as of date Dec. 20, 2019, available from Agroscope upon request.

The amount of ammonia and also other volatile off-flavour compounds can be measured according to Agroscope method 18.6.3.AA.003 ("Flüchtige Komponenten in Lebensmitteln mit Purge & Trap/GC") as of date Mar. 1, 2014 and/or Agroscope method 18.6.3.AA.002 ("HS-SPME/GC—Flüchtige Komponenten in Lebensmitteln") as of date Mar. 1, 2014. Both methods are available from Agroscope upon request.

In another advantageous embodiment, the above-mentioned first packaged cheese or piece of cheese leads to the formation of less than 100 ppm ammonia, preferably less than 80 ppm ammonia, more preferably less than 50 ppm ammonia when analysed according to the procedure mentioned above.

In addition, it was surprisingly found that a cheese or piece of cheese obtainable or obtained by the method of the invention leads to the formation of more of volatile flavour compounds that contribute to a positive flavour of the cheese (said cheese being more aromatic) than a comparable cheese that was not produced according to the method of the invention.

The group of substances which contribute to the positive flavour ("positive volatile flavour compounds") comprises ketones, aldehydes, alcohols and carboxylic acids but not ammonia or low molecular weight sulphur compounds.

In another advantageous embodiment, a cheese or piece of cheese obtainable or obtained by the method of the invention shows more positive volatile flavour compounds such as ketones, aldehydes, alcohols and carboxylic acids, in particular 10-80% (w/w) more positive volatile flavour compounds, than a comparable cheese that was not produced according to the inventive method. Methods for measuring such positive volatile flavour compounds are known in the art. A suitable method is analysis by headspace in-tube extraction (HS-ITEX) and solid phase microextraction (HS-SPME) sampling, followed by gas chromatography-mass spectrometry (GC-MS) detection.

An eighth aspect of the invention relates to a cheese or piece of cheese, in particular obtainable or obtained by the method of the invention, which has a residual smear layer comprising a lower total count of microorganisms calculated based on the surface area of the cheese or smear layer of the cheese, in particular a 50-99% lower total count of microorganisms (based on surface area of the cheese or smear), compared to a comparable cheese that was smear-ripened by a method currently known in the art. In particular, said lower total count relates to microorganisms selected from the group consisting of anaerobic bacteria, aerobic bacteria, yeasts, moulds and mixtures thereof, compared to a comparable cheese that was smear-ripened by a method currently known in the art.

Without wishing to be bound by theory, the thinner residual smear layer of a cheese or piece of cheese obtained by the inventive method, contributes to the lower total count of microorganisms.

Given the above definition, it is clear that the total count of microorganisms is not calculated relative to the weight of the smear but relative to the surface area of the cheese.

As above, in order to perform such a comparison, a reference cheese can be produced according to the method of the invention.

Various methods for the determination of such microorganisms are known in the art. Such methods are routinely performed by certified laboratories such as the Laboratoire agroalimentaire fribourgeois (LAAF). Exemplary methods are described in "Amato, Lea; ETH Diss. No. 21744; Impact of different packaging films on smear microflora composition, metabolic activity and quality of red-smear cheeses during cold storage". In general, while above, some amounts for specific characteristics have been indicated, it has to be understood that dependent on the actual cheese variety, the amounts can vary. Therefore, for determining whether a cheese has been produced according to the method of the invention, comparative cheeses of the same cheese group according to the German cheese regulation as of date 2 Jun. 2021 have to be produced by the inventive method and preferably also by a method for smear ripening that is currently known, and the characteristics indicated above be compared. For such comparative studies, the actually used method is not critical as long as for the test cheese and the comparative cheeses the same method is applied. In addition, also the ripening time is not crucial as long as all cheeses have the same age upon analysis.

A ninth aspect of the invention relates to the use of a sheet-like material (e.g. an envelope) in a method for producing smear-ripened cheese. The sheet-like material is as defined above in the context of an envelope and the method of manufacturing is also as described herein.

BRIEF DESCRIPTION OF THE DRAWINGS

The invention will be better understood and objects other than those set forth above will become apparent when consideration is given to the following detailed description thereof. This description makes reference to the annexed drawings, wherein:

FIG. 1A) No envelope. FIG. 1B) Envelope A. FIG. 1C) Envelope B. FIG. 1D) Envelope C

MODES FOR CARRYING OUT THE INVENTION

Figures 1A, 1B, 1C, 1D:
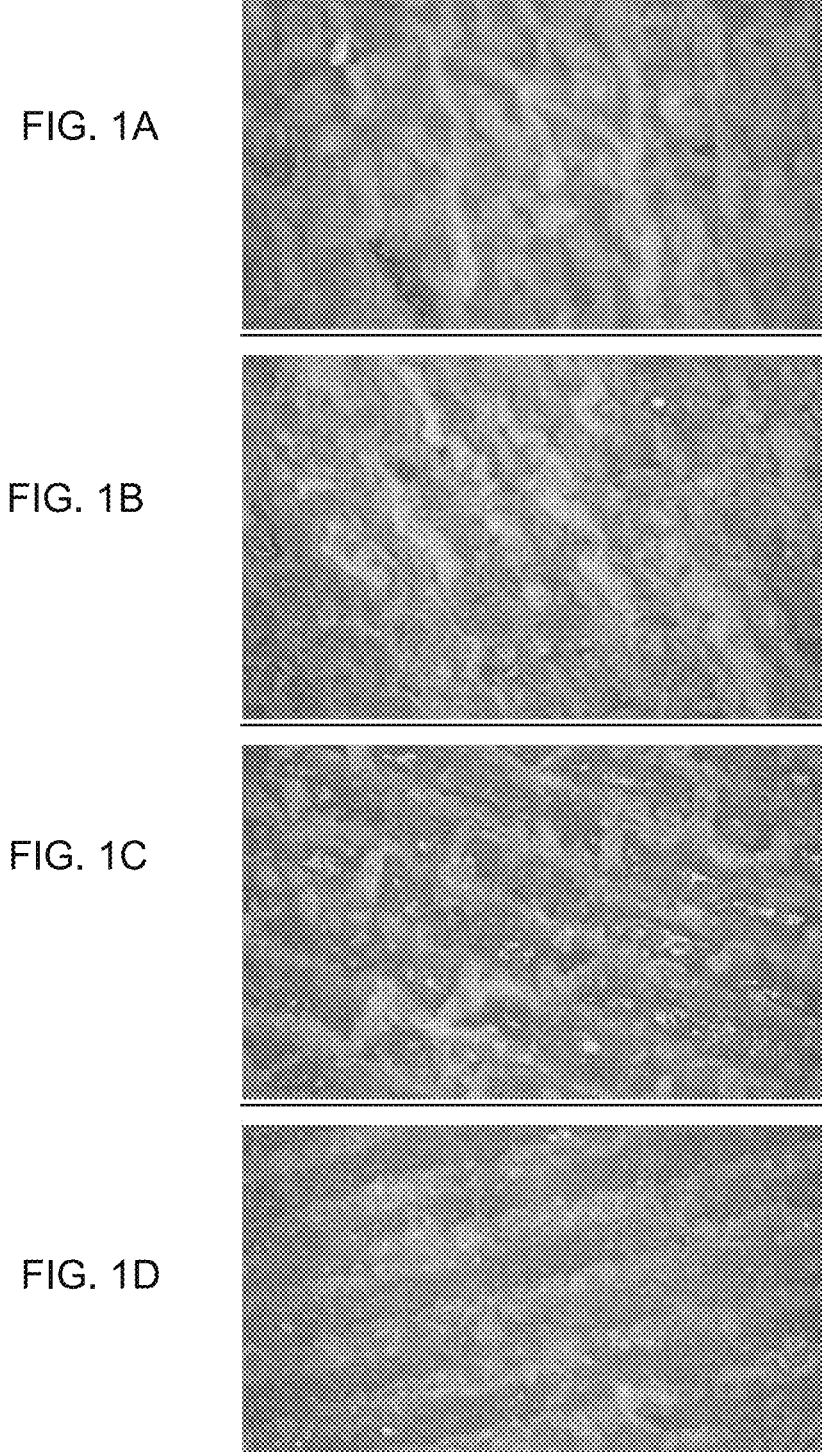
FIGS. 1A-1D: Picture (30× zoom) of the surface structure after 4 months of smear-ripening.
Figures 2A, 2B:
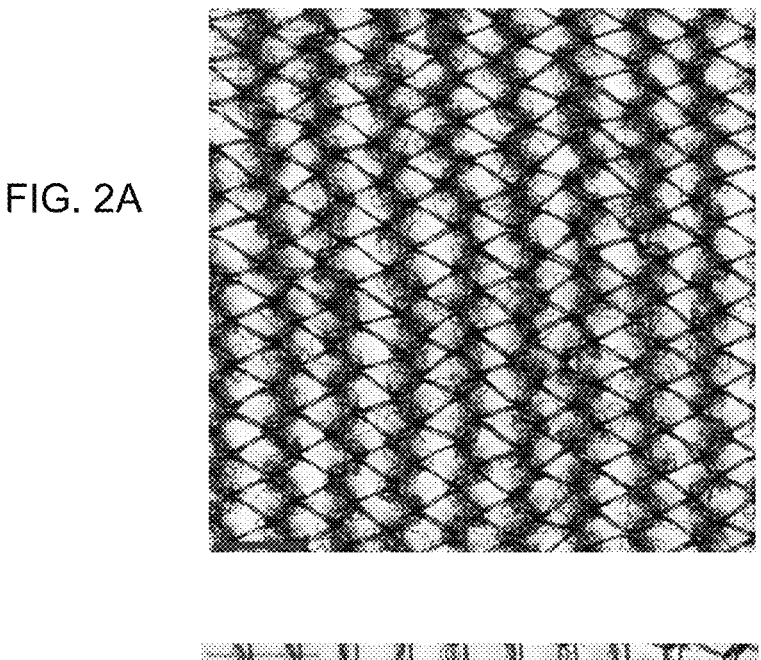
FIGS. 2A-2B: Picture of envelope A in a non-extended state (FIG. 2A) and in an elastically extended state (FIG. 2B)
Figures 3A, 3B:
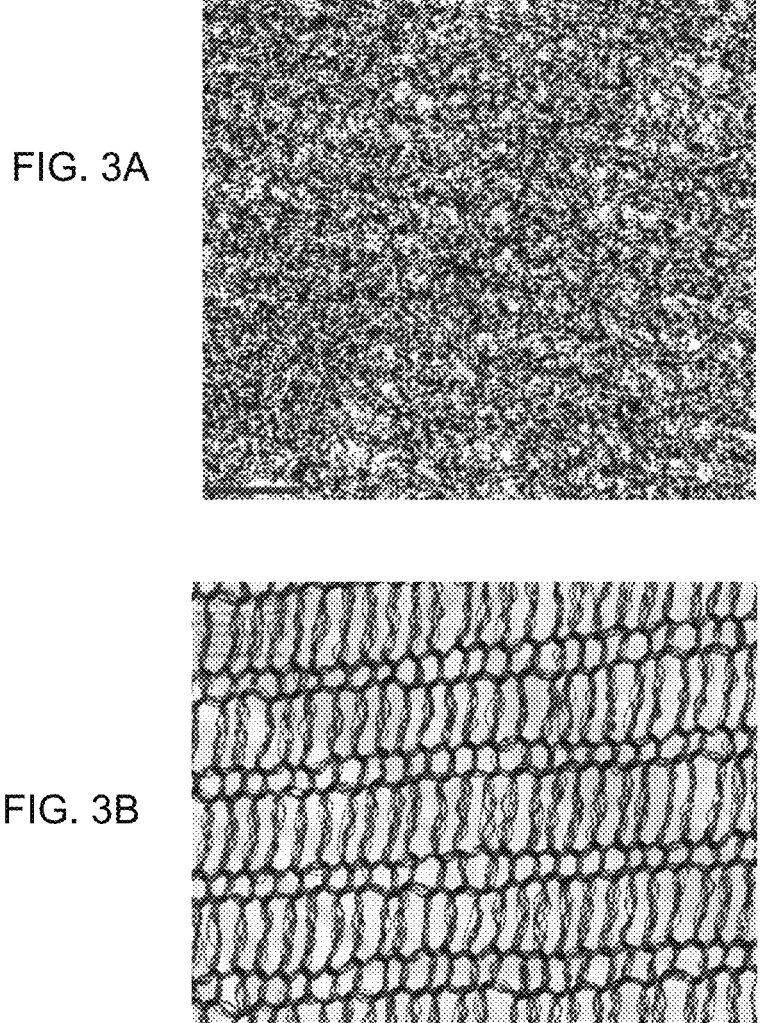
FIGS. 3A-3B: Picture of envelope B in a non-extended state (FIG. 3A) and in an elastically extended state (FIG. 3B)
Figure 4A:
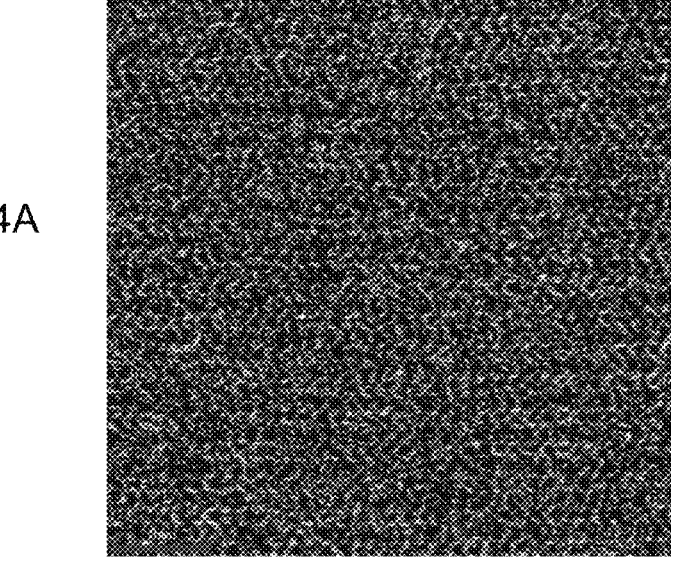
FIGS. 4A-4B: Picture of envelope C in a non-extended state (FIG. 4A) and in an elastically extended state (FIG. 4B)
Figure 4B:
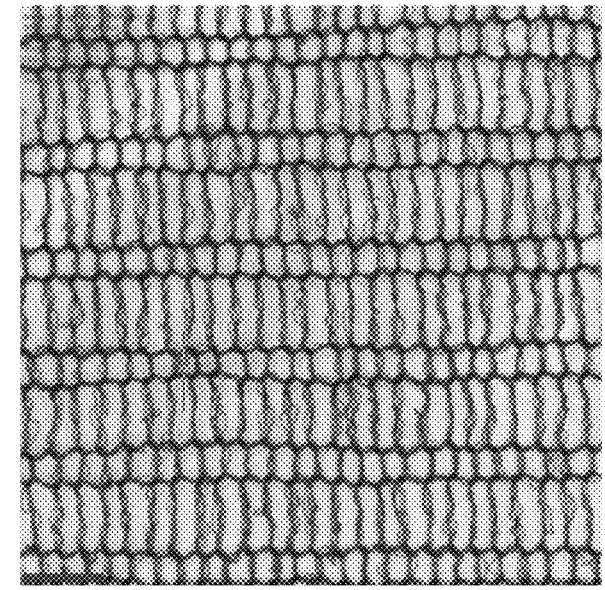

The following examples were performed with cheeses of one traditional semi-hard cheese variety. Different envelopes were compared to a cheese of the same cheese group (according to the German cheese regulation as of date 2 Jun. 2021) that was smear-ripened without an envelope. In the embodiments of the invention, an envelope was applied on a freshly brined cheese. Said envelope was applied on the cheese immediately after brining. Said envelope was in direct physical contact with the cheese over its entire surface. The envelope was permeable for metabolites produced by microorganisms and for microorganisms themselves and for gaseous elements, in particular surrounding air. Said envelopes were 100-300% elastic, as measured according to DIN EN 14704-1, and comprised pores with a mean pore size in the range of 0.01 mm-2.00 mm.

The envelopes comprised knitted fabrics consisting of yarns having a linear mass density in the range of 15-100 DTEX. The envelopes were in an elastically extended state before n applying on the freshly brined cheese.

Exemplary envelopes and their characteristics are listed in table 1 below.

TABLE 1

| | Exemplary envelopes | | | |
|---|---|---|---|---|
| Specification | Envelope A | Envelope B | Envelope C | Envelope D |
| Mean pore size extended state | 0.3-0.6 mm | 0.2-0.7 mm | 0.2-1.0 mm | 0.05-0.5 mm |
| Linear mass density Material | 17 DTEX 588 Nm | 22 DTEX 455 Nm | 17 DTEX 588 Nm | 100 DTEX 100 Nm |
| Polyamide | 90% | 100% | 79% | 0% |
| Elastane | 10% | 0% | 21% | 8% |
| Micro-modal | 0% | 0% | 0% | 92% |

Directly after applying the envelope, the cheese was immersed in a smear liquid comprising 2-5% sodium chloride and a combination of microorganisms selected from the group consisting of yeasts, Gram-positive bacteria, Gram-negative bacteria and moulds.

Subsequently, the enveloped cheese was kept humid by spraying onto said cheese water, optionally comprising 2-5% sodium chloride, 3-5 times per week until growth of the microorganisms within the smear layer had started. Then, the frequency of brushing was reduced stepwise to 1-2 times per week until the ripening process was complete.

Upon completion of the ripening, the envelope was removed and the cheese was packaged for distribution or sale.

As mentioned before, since the various types of a smear-ripened cheese differ in their composition as well as in their physical properties, the specific values given below were obtained using one traditional semi-hard cheese variety produced in one artisanal cheese dairy. Other types of smear-ripened cheeses may deviate from these values.

The specific values obtained for said traditional semi-hard cheese variety, which was either produced using the envelope A, B, C, D, or according to a conventional process, which does not include ripening within an envelope, are listed in tables 2, 3 and 4 below.

TABLE 2

| | | Total volatile carboxylic acids [mmol/kg +/− SD] | Iso-valeric acid [mmol/kg +/− SD] | Iso-butyric acid [mmol/kg +/− SD] | Acetic acid [mmol/kg +/− SD] |
|---|---|---|---|---|---|
| Parameter | Number of replicates | | | | |
| No envelope | 4 | 16.9 +/− 1.9 | 0.06 +/− 0.02 | 0.20 +/− 0.08 | 13.1 +/− 1.5 |
| Envelope A | 4 | 34.2 +/− 5.4 | 0.66 +/− 0.26 | 0.95 +/− 0.19 | 21.4 +/− 3.0 |
| Envelope B | 4 | 31.7 +/− 8.0 | 0.37 +/− 0.25 | 0.43 +/− 0.31 | 20.6 +/− 3.1 |
| Envelope C | 4 | 35.8 +/− 2.5 | 0.73 +/− 0.20 | 1.05 +/− 0.19 | 22.1 +/− 2.1 |

Total nitrogen:

TABLE 3

Results after 4 months of ripening (II)

| Parameter | Number of replicates | Total nitrogen [g/kg +/− SD] | Non-protein nitrogen [g/kg +/− SD] | Non-protein nitrogen [% total nitrogen +/− SD] |
|---|---|---|---|---|
| No envelope | 4 | 39.2 +/− 0.3 | 6.1 +/− 0.2 | 15.5 +/− 0.6 |
| Envelope A | 4 | 37.7 +/− 0.2 | 6.5 +/− 0.1 | 17.3 +/− 0.2 |
| Envelope B | 4 | 38.6 +/− 0.9 | 6.4 +/− 0.2 | 16.7 +/− 0.8 |
| Envelope C | 4 | 37.7 +/− 0.5 | 6.4 +/− 0.1 | 17.0 +/− 0.4 |

TABLE 4

Results after 4 months of ripening (III)

| Parameter | Number of replicates | Total lactic acid [mmol/kg +/− SD] | pH +/− SD; dimensionless | Force required for 33% deformation [N +/− SD] | Loss on drying [g/kg +/− SD] |
|---|---|---|---|---|---|
| Before ripening | 1 | — | — | — | 383 |
| No envelope | 4 | 90.6 +/− 3.3 | 5.66 +/− 0.04 | 21.1 +/− 0.4 | 357.3 +/− 6.7 |
| Envelope A | 4 | 59.6 +/− 14.4 | 5.90 +/− 0.09 | 16.7 +/− 3.5 | 382.8 +/− 5.7 |
| Envelope B | 4 | 41.7 +/− 10.3 | 5.82 +/− 0.04 | 14.2 +/− 1.4 | 376.3 +/− 5.5 |
| Envelope C | 4 | 46.7 +/− 15.1 | 5.93 +/− 0.09 | 13.6 +/− 0.9 | 389.5 +/− 6.2 |

The following analysis methods were used to obtain the results listed in table 2.

Water content (Loss on drying):

The water content was measured according to Agroscope method 13.8.ME.068 (accredited according to ISO/IEC 17025:2017), as of date Feb. 25, 2019, available from Agroscope upon request.

Total lactic acid:

Total lactic acid was measured according to Agroscope method 13.6 ME.026 (accredited according to ISO/IEC 17025:2017) as of date Apr. 3, 2014, available from Agroscope upon request.

Total volatile carboxylic acids:

Total volatile carboxylic acids were measured according to Agroscope method 13.8.ME.030 (accredited according to ISO/IEC 17025:2017) as of date Nov. 8, 2017, available from Agroscope upon request.

Iso-valeric acid:

Iso-valeric acid was measured according to Agroscope method 13.8.ME.030 (accredited according to ISO/IEC 17025:2017) as of date Nov. 8, 2017, available from Agroscope upon request.

Iso-butyric acid:

Iso-butyric acid was measured according to Agroscope method 13.8.ME.030 (accredited according to ISO/IEC 17025:2017) as of date Nov. 8, 2017, available from Agroscope upon request.

The concentration of total nitrogen was measured according to Agroscope method 13.8.ME.061 (accredited according to ISO/IEC 17025:2017) as of date Feb. 22, 2019, available from Agroscope upon request.

Non-protein nitrogen:

The concentration of non-protein nitrogen was measured according to Agroscope method 13.8.ME.054 (accredited according to ISO/IEC 17025:2017) as of date Feb. 2, 2019, available from Agroscope upon request.

The fraction of non-protein nitrogen relative to total nitrogen was calculated by dividing the concentration of non-protein nitrogen by the concentration of total nitrogen.

pH value:

The pH value was measured at the center of the cheese according to Agroscope method 13.8.ME.056 (accredited according to ISO/IEC 17025:2017) as of date Feb. 2, 2019, available from Agroscope upon request.

Force required for a 33% deformation:

The force required for a 33% deformation was measured according to Agroscope method 18.6.2.ME.026 (accredited according to ISO/IEC 17025:2017) as of date Jan. 23, 2017, available from Agroscope upon request.

Any of said cheeses that were produced using either of the envelopes A, B or C—also after removal of the envelope—had a red-orange coloured surface.

Any of said cheeses, which were produced using either of the envelopes A, B or C—after removal of the envelope— had a residual smear layer with a mean thickness of less than 10% compared to an otherwise identical traditional semi-hard cheese variety that was produced according to a conventional method for smear-ripening, which does not include ripening within an envelope and removing the envelope.

Any of the cheeses that were smear-ripened according to the method of the invention had a residual smear layer with a mean thickness of 0.1 mm whereas the cheese that was produced according to a conventional method had a residual smear layer with a mean thickness of 1 mm.

While there are shown and described presently preferred embodiments of the invention, it is to be distinctly understood that the invention is not limited thereto but may be otherwise variously embodied and practiced within the scope of the following claims.

The invention claimed is:

1. A method for producing smear-ripened cheese, comprising the steps:
  (a) applying an envelope on a pressed and freshly brined cheese, said envelope being in direct physical contact with the surface of the cheese, said envelope being permeable for metabolites produced by microorganisms and for microorganisms themselves and for components of the cheese and for gaseous elements;
  (b) ripening the cheese within the envelope;
  (c) removing the envelope with thereon adherent part of a smear formed during ripening; and
  (d) packaging the cheese for transport and/or sale; and wherein the envelope comprises knitted fabrics, woven fabrics, or non-woven fabrics.

2. The method according to claim 1, wherein the envelope contains pores having a mean size in the range of 0.01 mm-2.00 mm, wherein the mean size relates to
  a) in case of a circular pore, the pore size relates to the diameter of the pore; or
  b) in case of an oval or polygonal shape of the pore, the pore size relates to the distance between the most distant points or corners of the pore as measured by light microscopy.

3. The method according to claim 1, wherein the envelope is 10-500% elastic as measured according to DIN EN 14704-1.

4. The method according to claim 1, wherein the envelope comprises materials selected from the group consisting of natural polymeric materials, synthetic polymeric materials, and mixtures thereof, wherein the natural polymeric materials are selected from the group consisting of cellulose, cotton, wool, silk, cashmere and mixtures thereof, and wherein the synthetic polymeric materials are selected from the group consisting of cellulose-derivatives, polyamides, elastomers, polyurethanes, polyolefins, polyesters, polyethylene glycols, acrylics, and mixtures thereof.

5. The method according to claim 4, wherein the envelope consists of a mixed fabric of (i) modal or micromodal and (ii) elastane.

6. The method according to claim 1, wherein the envelope comprises knitted or woven-fabrics consisting of yarns having a linear mass density of 5-165 DTEX.

7. The method according to claim 1, wherein, before step (a), the envelope is in an elastically extended state.

8. The method according to claim 1, wherein step (b) is divided into the following steps:
  (b1) immersing the enveloped cheese in a smear liquid, optionally comprising surface starter organisms; and
  (b2) keeping the cheese humid by spraying onto said cheese water, optionally comprising 2-5% sodium chloride, at regular time intervals, which are adjustable during the ripening period.

9. The method according to claim 1, wherein the gaseous elements are surrounding air.

10. The method according to claim 1, wherein the envelope comprises knitted fabrics.

11. The method according to claim 4, wherein, when the envelope comprises cellulose-derivatives, the cellulose-derivatives are cellulose acetate or nitrocellulose.

12. The method according to claim 4, wherein, when the envelope comprises polyolefins, the polyolefins are polypropylenes.

13. The method according to claim 4, wherein, when the envelope comprises polyesters, the polyesters are polyethylene terephthalate.

14. The method according to claim 6, wherein the envelope comprises knitted fabrics.

15. The method according to claim 6, wherein the wherein the envelope comprises knitted or woven-fabrics consisting of yarns having a linear mass density of 15-100 DTEX.

* * * * *